March 11, 1958 M. F. COOK 2,826,741

SIGNAL GENERATOR SYSTEM

Filed June 29, 1955

INVENTOR.

Marion F Cook

BY Mueller & Aichele

Attys.

United States Patent Office 2,826,741

Patented Mar. 11, 1958

2,826,741

SIGNAL GENERATOR SYSTEM

Marion F. Cook, Phoenix, Ariz., assignor to Motorola, Inc., Chicago, Ill., a corporation of Illinois Application June 29, 1955, Serial No. 518,860

6 Claims. (Cl. 332—14)

Figure 1:
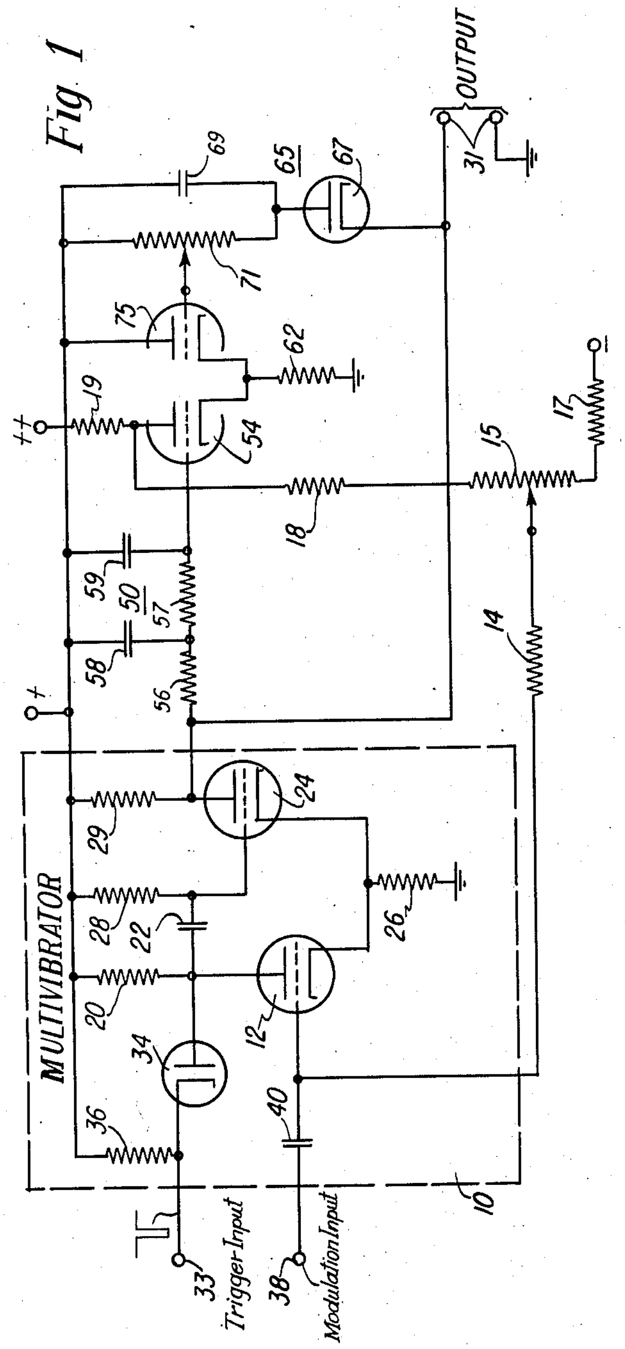

This invention relates to control systems and more particularly to a control system for regulating the pulse duration in a pulse signal generator.

There are various applications in which it is desirable to use a signal generator furnishing a cyclic signal comprising pulse wave portions which are a fixed fraction of the time for a complete cycle. For example in time division multiplexing, two or more modulating signals may be applied to a communication system each during a definite fraction of a cycle through control furnished by pulse waves. As examples, the pulse waves may sample modulating signals with such samples being transmitted in sequence or the pulse duration itself may be varied to provide the transmitted information sequentially in a time division system. However, in order to prevent the interference of one modulating signal with another, the wave regulating the application of modulating signal to the system must be accurate with respect to the cycle time or time for applying all signals sequentially to the system. Such accurate division of application time for signals, that is accuracy of duty cycle, may be of as great importance as the maintenance of highly accurate absolute time for the complete cycle. Furthermore, it may be advantageous to utilize as much of each cycle as possible, that is to have one modulating signal follow another in close sequence without gaps therebetween. Accordingly, a signal generator regulating application of modulating signals must be very stable and provide accurate timing of its active wave portion with respect to its inactive portion. Also, in systems wherein information is transmitted by modulating the pulse duration, it is often desirable to hold the average pulse length constant to facilitate detection of the modulation therefrom.

Some of the prior art wave signal generators have not furnished the desired timing accuracy of the generated wave. That is, a slight change in circuit parameters, for example, the aging of an electron tube in one of the generators, might vary the fractional division of the wave.

Accordingly it is an object of this invention to provide a control system for a cyclic wave generator to regulate with great accuracy the fractional division of portions of its output wave thus permitting improved operation of various time division systems.

Another object is to provide a signal generating system of great accuracy and stability in spite of ordinarily influential changes in circuit parameters of the signal generating system.

Another object of the invention is to provide a control system for a pulse generator which maintains a duty cycle substantially independent of changes in the peak value of an output signal developed thereby.

A feature of the invention is the provision of an improved control circuit for a wave signal generator which is responsive to a relative change in a peak portion of a generated signal with respect to the average level of the signal, thus detecting a change in time duration of the peak portions of the signal with respect to the period of the wave. The circuit produces a control potential to regulate the signal generator and control the fractional part of the cycle represented by the peak portion.

Another feature of the invention is the provision of a signal generating system including a control circuit with filter apparatus adapted to develop a first potential related to the average of the generated signal, a rectifier adapted to develop a second potential related to a peak value of the generated signal and a comparison circuit adapted to detect a change in the relative values of the first and second signals and thus regulate the time length or duration of a wave portion in the signal generator with respect to such a change.

Figure 2:
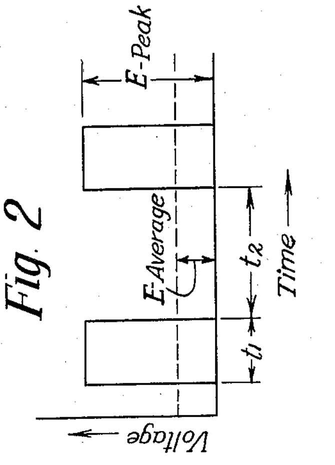

Further objects, features and the attending advantages thereof will be apparent upon consideration of the following description of the invention when taken in conjunction with the accompanying drawings in which:

Fig. 1 is a schematic diagram illustrating a signal generator incorporating the control system of the invention; and Fig. 2 is a representation of a generated signal useful in explaining the operation of the invention.

According to the invention there is provided a control system for maintaining a wave portion of a cyclic signal generator at a fixed fractional part of the period of the signal. The system includes a filter circuit coupled to the output of the signal generator and adapted to produce a first potential proportional to the average level of the generated wave. A rectifier circuit is also coupled to the output of the generator, and this circuit provides a second potential proportional to the peak value of a portion of the generated wave. Since the average level of the generated signal is proportional to the period, or cycle time, for the generated signal and the peak value of the peak portion of the wave is proportional to the duration of that portion, the first and second potential may be compared in a difference amplifier which develops a control signal in response to a relative change in the first potential with respect to the second potential. The control signal is then applied to the signal generator as a bias for regulating the duration of the wave portion produced thereby.

The generator may be a multivibrator and the control signal may be applied to a control element of one of a pair of electron discharge devices alternately conducting therein to produce the signal. The control signal may bias this discharge device to regulate its conduction time and thus the duration of a portion of the generated signal. A change in the peak value of the signal would raise both the first and second potential in proportion thus not affecting the signal generator. However, a change in the duration of the peak wave portion would affect the first potential (which is proportional to the average of the generated signal) but not the second potential (which is proportional to the peak portion of the wave), and the resultant control signal compensates for this change in the division of the generated signal.

The diagram of Fig. 1 illustrates the control circuit of the invention as used with a monostable multivibrator 10. A first electron valve 12 in the circuit 10 has a control element with a D. C. return through resistor 14, variable resistor 15, and resistor 17 to a negative potential. Resistors 17, 15, 18 and 19 are series connected between the negative potential and a high voltage source, B++, to form a voltage divider from which a bias is applied to valve 12 from resistor 15. Electron valve 12 also includes an anode element which is coupled through resistor 20 to a positive potential source or B+ and through capacitor 22 to the control element of electron valve 24. The cathode element of valves 12 and 24 are connected together and to ground through the common resistor 26. The control element of valve 24 and the anode element thereof are respectively connected to the positive potential source through resistors 28 and 29. Output terminals 31 for the multivibrator circuit 10 are connected between ground and the anode of valve 24.

A triggering pulse may be applied to the circuit 10 by way of terminal 33 through the diode 34 having its anode element coupled to the anode element of the valve 12. Resistor 36 is connected between the positive potential source and the cathode of diode 34 in order to prevent the development of any bias on this diode. Terminal 38 is coupled to the control element of electron valve 12 through the capacitor 40, and this terminal may be used for the application of a time modulation signal to the multivibrator circuit.

In the stable condition of the circuit 10, valve 24 is conducting and a small amount of grid current is drawn thereby so that capacitor 22 is charged substantially to the value of the positive potential source. Valve 12 remains cut off due to the bias applied between its cathode and control element by conduction of valve 24 through resistor 26 and the bias potential appearing at the arm of variable resistor 15.

The multivibrator circuit 10 is set into operation by the application of a negative going trigger pulse between terminal 33 and ground. Such a pulse is conducted through the diode 34 and capacitor 22 to the control element of the electron valve 24 thereby cutting off this valve. The pulse also reduces the potential at the anode of valve 12 while at the same time the cessation of conduction of valve 24 causes a reduction in the bias of valve 12 since there is no longer current flowing in the resistor 26. Accordingly valve 12 may conduct to further lower the potential appearing at its anode element. Capacitor 22 has previously accumulated a charge substantially equal to the positive potential due to the small amount of grid current flowing through resistor 28 as previously mentioned. Accordingly due to the reduction in potential at the anode of valve 12 as it conducts, capacitor 22 discharges through resistor 28 thus biasing the valve 24 considerably below its conducting point.

Eventually the discharge current of capacitor 22 through resistor 28, determined by the R. C. time of this combination and the potential at the anode of valve 12, will be reduced to the point where valve 24 may again become conductive. As valve 24 conducts, the current through resistor 26 is increased causing an increase of the bias on valve 12 and a negative pulse is applied through capacitor 22 to the anode of valve 12 all of which rapidly causes cut off of this valve. The process is thus completed until a further negative pulse is applied to terminal 33.

A modulating signal may be continuously applied between terminal 38 and ground and this signal will determine the duration of the conduction of valve 12 since it will influence the potential at the anode of valve 12 and thus the discharge time of capacitor 22. Accordingly at output terminals 31 will appear a pulse of substantially the value of the positive potential, which pulse is initiated at the time of application of the triggering signal and has a duration proportional to a portion of the modulation applied to terminal 38, that is, the trailing edge of the pulse is time modulated.

Fig. 2 illustrates the wave form of an unmodulated signal appearing at the output terminals 31. The vertical axis represents instantaneous voltage. The peak potential of the wave form, it may be observed, will rise approximately to the value of the positive potential. Time is represented along the horizontal axis, and it is contemplated that the unmodulated pulse duration would last for a time T1 and that the remainder of the signal would last for a time T2. It has been found that the time T1 is in the same relation to the time T1 plus T2 as the average level of the unmodulated output signal is to the peak potential of the output signal. The system utilizes this relation as will be evident upon further consideration.

The control circuit of the invention includes a low pass filter 50 which is coupled between the anode of valve 24 and the control element of valve 54. The filter 50 consists of a pair of series resistors 56 and 57 and capacitor 58 coupled between resistors 56 and 57 to the positive potential source in addition to capacitor 59 which is coupled from the control element of the valve 54 to the positive potential source. The elements of low pass filter 50 are selected to provide a potential at the control element of valve 54 which is proportional to the average of the output wave from multivibrator circuit 10. Accordingly filter 50 removes the modulation and repetition rate components from this signal. This portion of the control circuit is completed by resistor 19 which provides a plate load for valve 54 and resistor 62 which is coupled between the cathode of valve 54 and ground to funish a cathode bias for this valve.

Also connected between the anode of valve 24 and the positive potential source is a rectifier circuit 65. This comprises a diode 67 having its cathode connected to the anode of valve 24 and capacitor 69 series connected therewith. A variable resistor 71 has the fixed portion thereof coupled across capacitor 69. The constants of rectifier circuit 65 are such that the peak potential of the output wave form appears across variable resistor 71. The arm of resistor 71 is coupled to the control grid element of electron valve 75, the cathode of which is connected to the cathode of valve 54 and the anode of which is coupled to the positive potential source. Therefore, it may be seen that a selected portion of the peak potential of the output wave may be applied to the valve 75 in the form of a bias.

As previously pointed out, the setting of variable resistor 15 determines the level of a fixed bias applied to the electron valve 12 which in turn determines the duration of the output pulse of the system by influencing the potential at the anode of valve 12 when this valve is conducting, and thus changing the discharge time of capacitor 22. It is apparent that the conduction of valve 54 will influence the current through resistor 19 and will therefore have an effect on the bias applied to valve 12. In this circuit it is contemplated to adjust resistor 15 when the triggering pulse is being applied to terminal 33 and when valve 54 is under a bias proportional to the average level of the output signal provided by the low pass filter 50 so that the time relation of T1 to T1+T2, as shown in Fig. 2, will be determined by the setting of resistor 15.

When variable resistor 15 has been properly adjusted, variable resistor 71 is adjusted to provide a portion of the peak output potential on the control element of valve 75 which is equivalent to the bias potential applied to the valve 54 by the filter 50. Accordingly valves 54 and 75 act as a difference amplifier and a proportional change in the input to each of these valves will not affect a change in the bias applied through resistor 14 to the valve 12. The common cathode resistor 62 should be of a large value so that as both the average and peak portions of the output wave change in the same direction, the gain of the difference amplifier comprised of valves 54 and 75 will remain substantially the same. However, if the duration of the unmodulated pulse would become longer or shorter, the conduction level of 54 would vary accordingly, while the conduction of valve 75 would remain the same since the peak level of the output signal would not be changed. Thus it may be seen that if the unmodulated pulse width should decrease in duration, that is if T1 increases, the filter 50 will apply a somewhat more negative bias to valve 54 thus biasing the valve 50 in a positive direction to lower the potential at the anode thereof when this valve conducts and to thereby increase the discharge time for capacitor 22 thus lengthening the time T1. A comparable but reverse operation takes place when the pulse time increases, and the control system provides automatic correction of this condition in the multivibrator circuit.

As is familiar to those in the art, a change in the unmodulated pulse duration may be due to various causes among which would be the aging of electron valves 12 and 24 which might cause a change in the time division of an output cycle. Therefore, it may be seen that this invention provides a control system for regulating the duration of a pulse in a cyclic signal generator. The generator may thus be maintained at high accuracy and great stability even when changes have occurred in the circuit parameters thereof. Such a generator system having a stable duty cycle finds use in allowing greater time modulation in communication systems where more than one signal is being transmitted, and reduces the tendency for interference or inter-modulation of one signal with another. Furthermore, the system has provision for adjustment of the desired output form so that it may be simply altered when changed or different applications so require.

I claim:

1. In signal generating apparatus adapted to produce a cyclic signal having first and second wave portions and including a circuit portion responsive to a control signal for altering the duration of one wave portion with respect to the other, the control system for such apparatus including in combination, filter means for producing a first potential directly proportional to the average amplitude of the cyclic signal, rectifier means for producing a second potential directly proportional to the peak amplitude of the cyclic signal, circuit means coupled to said filter means and said rectifier means for producing a control signal in response to a change in the value of one of said first and second potentials with respect to the other, and means for applying said control signal to said circuit portion for regulating the duration of a wave portion of the cyclic signal.

2. In a signal generator adapted to produce a pulse wave having first and second wave portions and including circuit means responsive to a control potential for altering the duration of one wave portion with respect to the other, the control system for such a generator to maintain substantially uniform the average time division between said wave portions including in combination, means for producing a first potential related to the average amplitude of the pulse wave, rectifier means for producing a second potential related to the peak amplitude of the pulse wave, circuit means coupled to said filter means and said rectifier means for producing a control potential in response to a change in the value of one of said first and second potentials with respect to the other, and means for applying the control potential to the circuit means for regulating the duration of a wave portion of the pulse wave.

3. In signal generating apparatus adapted to produce a cyclic signal having first and second wave portions and including an electron discharge device having a control element responsive to a control potential for altering the duration of one wave portion with respect to the other, the control system for such a generator including in combination, low pass filter means for producing a first potential related to the average level of the cyclic signal, rectifier means for producing a second potential related to the peak level of the cyclic signal, comparison amplifier means having a portion coupled to said filter means and a portion coupled to said rectifier means for producing a control potential in response to a change in the value of said first potential with respect to said second potential, and means for applying the control potential to the control element for regulating the duration of a wave portion of the cyclic signal.

4. A pulse generator apparatus for applying modulation to a signal translating system including in combination, a pulse generator adapted to produce pulses for applying the modulation to the translating system during the occurrence of the pulses, said generator including an electron valve with a control element responsive to a bias potential for regulating the pulse duration, a low pass filter coupled to said generator to filter the pulses and produce a first potential equal to the average level thereof, circuit means coupled to said generator for producing a second potential related in value to the peak level of the pulses and responsive only to variations in the peak level of the pulses, a potential dividing network for providing a fixed bias potential for said control element to determine the pulse duration, and a comparison device having a first section controlled by said first potential and a second section controlled by said second potential and circuit means coupling said comparison device to said control element for modifying the bias potential applied thereto as said first potential varies to the exclusion of said second potential for thereby changing the pulse duration.

5. Pulse generator apparatus for applying modulation to a signal translating system including in combination, a mono-stable multi-vibrator adapted to produce pulses in response to triggering signals and to apply the modulation to the system during the pulses, said multi-vibrator including an electron valve with a control element responsive to a bias potential for regulating pulse duration, a low pass filter coupled to said multivibrator to filter the pulses and produce a first potential equal to the average level of the pulses, circuit means coupled to said multivibrator for producing a second potential adjustable in value to be equal to said first potential and responsive only to variations in the peak level of the pulse, a potential dividing network for providing a fixed bias potential for said control element to determine pulse duration, and a comparison amplifier having a first electron discharge device with the conduction thereof controlled by said first potential and a second electron discharge device with the conduction thereof controlled by said second potential, a portion of said potential dividing network comprising an output load impedance for said first electron discharge device, so that, variation in said first potential to the exclusion of said second potential modifies the bias potential to said control element for changing pulse duration.

6. A signal generating system including in combination, a mono-stable multi-vibrator adapted to produce an output pulse in response to a triggering signal and to be responsive to a modulating signal for time modulation of the pulse, said multivibrator including an electron valve with a control element to which the modulating signal is applied and which is responsive to a bias potential for regulating the pulse duration when unmodulated, a low pass filter coupled to said multivibrator to filter the modulating signal and produce a first potential equal to the average level of the unmodulated pulse, circuit means coupled to said multivibrator for producing a second potential adjustable in value to be equal to said first potential and subject to variation as the peak level of the pulse may vary, a potential dividing network for providing a fixed bias potential for said control element to determine the unmodulated pulse duration, and a comparison amplifier having a first electron discharge device with the conduction thereof controlled by said first potential and a second electron discharge device with the conduction thereof controlled by said second potential, a portion of said potential dividing network comprising an output load impedance for said first electron discharge device, so that, variation in said first potential to the exclusion of said second potential applies an altered bias potential to said control element for changing the unmodulated pulse duration.

References Cited in the file of this patent

UNITED STATES PATENTS 2,700,068 Muller ---------------- Jan. 18, 1955
2,707,268 Person ---------------- Apr. 26, 1955